United States Patent

[11] 3,626,480

| [72] | Inventors | Masuya Takei;<br>Hideyuki Kawasaki; Taira Yasuda, all of Takatsuki, Japan |
|---|---|---|
| [21] | Appl. No. | 59,914 |
| [22] | Filed | July 31, 1970 |
| [45] | Patented | Dec. 7, 1971 |
| [73] | Assignee | Kuraray Co., Ltd.<br>Osaka, Japan |
| [32] | Priority | Aug. 11, 1969 |
| [33] | | Japan |
| [31] | | 44/64577 |

[54] DEVICE FOR HEATING AND COOLING PLASTIC SHEETS
10 Claims, 2 Drawing Figs.

[52] U.S. Cl. .................................................. 165/61,
    165/89, 34/1, 34/66
[51] Int. Cl. ........................................................ F26b 13/00
[50] Field of Search .......................................... 165/61, 65,
    62, 89, 90, 120; 34/1, 13, 41, 66, 62, 110

[56] References Cited
UNITED STATES PATENTS

| 2,661,669 | 12/1953 | Friedrich, Jr. ................ | 34/13 X |
| 2,565,063 | 8/1951 | Briscoe et al. ................ | 165/61 X |

*Primary Examiner*—Frederick L. Matteson
*Assistant Examiner*—W. C. Anderson
*Attorney*—Christen & Sabol ABSTRACT: Apparatus for continuously heating and cooling continuous lengths of sheet material comprises a hollow cylinder of ferromagnetic material rotatably mounted on a horizontal axis, with an electromagnetic induction heating device placed in a fixed position to continuously inductively heat a peripheral area of the cylinder as it moves past that position, the cylinder being partially filled with a cooling liquid to continuously and successively cool the heated peripheral area and rollers to guide the sheet material successively in contact with the heated and cooled periphery of the cylinder.

DEVICE FOR HEATING AND COOLING PLASTIC SHEETS

The present invention relates to a device for treating sheet materials made of plastics. Namely, one part of a rotatable cylinder is heated through electromagnetic induction, and another part of the cylinder is cooled by a cooling medium, thereby providing a heating zone and a cooling zone on the same cylinder. Thus, while the plastic sheet material is kept on the cylinder in close contact therewith, both the heating and the cooling necessary for the stamping, calendering, curing and laminating processes are continuously performed on the cylinder.

One object of the invention is to eliminate the necessity for providing a separate heating and cooling devices for treating long lengths of plastic materials.

Another object of the invention is to provide apparatus which is capable of combining the steps, of heating and immediately cooling, long lengths of sheet materials so that the two operations may be continuously performed regardless of the amount of sheet material involved.

A still further object is to provide apparatus capable of embossing or calendering long lengths of sheet material together with the application of heat and cooling in a continuous operation.

Other objects and advantages will be apparent to those skilled in the art after reading the following specification in connection with the annexed drawings, in which.

Figure 1:
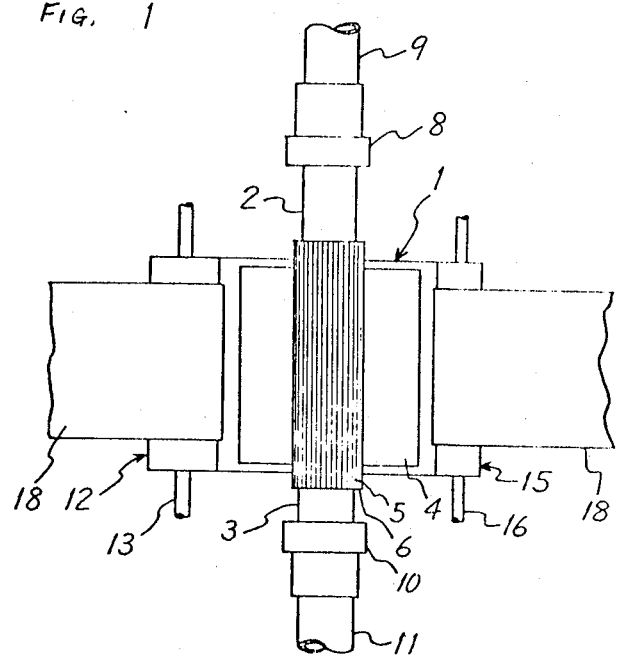
FIG. 1 is a schematic plan view of a preferred form of apparatus constructed in accordance with this invention.

In the drawings, the numeral 1 indicates generally a hollow cylinder having a peripheral wall 7 constructed of metal, preferably steel, iron, or some other ferromagnetic material and the cylinder is provided with axially extending hollow shafts 2 and 3 which may be mounted in supports (not shown) for rotation of the cylinder about a horizontal axis.

In the drawing an electromagnetic heating device, including an iron core 4 having two spaced legs, forming pole pieces, is installed in a fixed position adjacent one area of the periphery of the cylinder so that the pole pieces are also spaced from the surface of the cylinder by the respective clearances 20 and 21. In the drawing, it is shown on the exterior, but it could be placed within the cylinder so long as the pole pieces are positioned adjacent an area of the cylinder which lies outside of the area of the cylinder which comes in contact with a body of cooling medium 23 which partially fills the interior thereof. The core 4 is preferably made of laminated strips of silicon steel but, of course, other materials may be used and the inducting heating device may include more than two poles and there may be more than one heating means connected together in parallel, in series, or a combination of the two. In the simplified form shown, the core is energized by a coil 6 comprising wires 5 wound about the core 4 in an axial direction for connection with a source of alternating current (not shown). The cooling medium is introduced into the interior of the cylinder by means of a pipe 9, connected by rotary coupling 8 with the hollow shaft 2 and can be withdrawn through hollow shaft 3 by means of the rotary coupling 10, connected with pipe 11.

Means for continuously guiding sheet material 18 in contact with a portion of the exterior periphery of the cylinder 1 includes a roller 12 rotatably supported on shaft 13 mounted parallel with the axis of rotation of the cylinder with a clearance between the peripheral surface 14 of the roller and the periphery 7 of the cylinder just sufficient to permit passage of the sheet material 18. After being brought into contact with the surface of the cylinder, the sheet material moves with the cylinder into it reaches an outlet roller 15, rotatably supported on shaft 16 for rotation about an axis parallel with that of the cylinder, with the surface 17 of this roller also spaced from the cylinder a distance sufficient to permit treatment of the sheet material.

Figure 2:
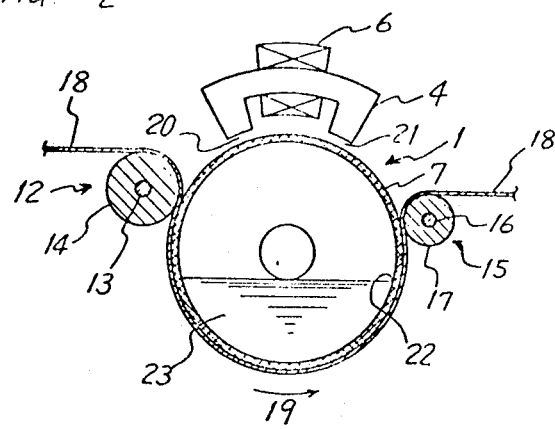
Fig. 2 is a vertical cross section of the device shown in FIG. 1.

As shown in FIG. 2, the rotation of the cylinder 1 is in a counterclockwise direction as indicated by arrow 19 and the inlet roller 12 is shown as being positioned to bring the sheet material 18 into contact with the surface of the cylinder in an area other than the area adjacent the induction heating core 4 and where the surface has not yet come in contact with the internal cooling medium 23, while the roller 15 is arranged to take the sheet material off the cylinder at a point beyond the area where the surface of the cylinder has completed contact with the cooling medium. However, it should be understood that the inlet roller 12 could be positioned at a location to the right of the core 4 (as seen in FIG. 2) to cause the sheet material to pass under the core 4 as well as to continue around the lower cooled portion of the cylinder, in which case the outlet roller 15 might well be positioned at a location within the area of the cylinder in contact with the cooling medium.

In operation, when an alternating current is applied to the coil 6, the alternating magnetic flux produced thereby passes in a closed path running from the iron core 4 through the clearance 20, the peripheral wall 7 and the clearance 21 back to the iron core 4, thus closing the magnetic circuit. By this alternating magnetic flux, eddy currents are induced on the parts of the outside surface of the peripheral wall 7 which are under the clearance 20 and 21, and the peripheral wall 7 which is between the clearance 20 and the clearance 21, and a short-circuiting current is induced by the magnetic flux passing within that part of the peripheral wall. The current runs in the axial direction of the cylinder 1 on the outside surface layer of the peripheral wall, in the radial direction at the end, then again in the axial direction of the cylinder 1 on the outside surface layer of the peripheral wall, in the radial direction at the end, then again in the axial direction on the inside surface layer of the peripheral wall, and back to the outside surface layer along the radial path on the other end. Due to both of these currents, heat is produced in the area of the peripheral wall 7 facing the iron core 4, and as a result, that part of the peripheral wall 7 is inductively heated to a rather high temperature.

On the other hand, when a cooling medium 23 in liquid form having a sufficiently low boiling point is supplied through the pipe 9 so that a desired level is maintained as indicated by a position 22 in the cylinder 1, if the peripheral wall 7 is heated higher in temperature than the boiling point of the cooling medium 23, the cooling medium 23 in contact therewith boils and is evaporated. When this occurs, the cooling medium absorbs the heat from the peripheral wall 7, thereby reducing the temperature of the peripheral wall 7 over the area where the cooling medium 23 is in contact. The cooling medium evaporated is discharged through the pipe 11. While, in this embodiment the latent heat of evaporation of the cooling medium 23 is preferably utilized to cool the peripheral wall 7, the utilization of sensible heat may be practicable.

Since the cylinder 1 continues rotating, the rise and the fall of the temperature is continuously repeated on the peripheral wall 7 due to both the self-heating caused by the alternating magnetic flux mentioned above and the cooling by means of the cooling medium 23. Thus, the peripheral wall 7 continuously repeats the operation of heating and cooling the plastic sheet material 18 as it travels in contact with the peripheral wall 7 and is fed away from it by roller 15.

As detailed in the foregoing, in the device for heating and cooling plastic sheets of this invention, the self-heating by way of electromagnetic induction is utilized to provide the source for heating. Accordingly, in this device, as compared with devices where the heating medium and the cooling medium are used respectively for the heating and for the cooling, the construction of the device is simple, and the trouble that may arise through the admixture of the heating medium and the cooling medium may be foreclosed.

From the standpoint of the temperature setting, the temperature at the heating side may be set by controlling the current or the frequency of the alternating current which energizes the wire coil, and, compared with the practice of temperature raising by use of an infrared heating device, etc., this method permits a higher speed of temperature raising. Consequently, it may be expected to achieve an improved capability. When the iron core is arranged outside the cylinder and the plastic sheet material is passed between the iron core and the cylinder, being in contact with the surface of the peripheral wall of the cylinder it is possible to raise the temperature of the peripheral wall of the cylinder without elevating the temperature of the plastic sheet material itself, that is to say, to raise the temperature of only the surface of the plastic sheet material which contacts with the surface of the peripheral wall by way of choosing an appropriate value of the current and the frequency of the alternating current given to the coil. On the other hand, at the cooling side, the setting of the specified temperature is easily carried out by adjusting the flow rate or the pressure of the cooling medium in the cylinder. The plastic sheet material treated by this device for heating and cooling plastic sheets permits clear stamping and calendaring. By the use of this device, such sheet materials as poromerics, which have been developed recently may be embossed without causing a reduction in moisture permeability; and other effective treatments are made feasible.

It will also be understood that various modifications and improvements may be made which come within the scope of the annexed claims. We claim:

1. Apparatus for heating and cooling indeterminate lengths of sheet material comprised a hollow cylinder mounted for rotation about a horizontal axis and having a peripheral surface of ferromagnetic material, electromagnetic means positioned adjacent a portion of the surface of said cylinder for inductively heating successive portions of the area of said surface during rotation, means for maintaining a cooling medium within the interior of said cylinder in heat exchanging relationship with another successive portion of the area of said peripheral surface during said rotation, and means for guiding successive portions of a length of sheet material into successive contact with the heated and cooled areas of said cylinder during said rotation.

2. The invention defined in claim 1 wherein said electromagnetic means include an electromagnetic having at least two pole pieces radially spaced from said peripheral surface and circumferentially spaced from each other.

3. The invention as defined in claim 2 wherein said pole pieces are positioned exteriorly of said cylinder.

4. The invention as defined in claim 1 wherein said means for guiding sheet material includes a pair of spaced rollers mounted for rotation about axis parallel with the axis of said cylinder.

5. The invention as defined in claim 4 wherein one of said rollers is positioned to guide the sheet material into contact with said peripheral surface at a location between the area where the surface is inductively heated and the area where the surface comes into heat exchanging relationship with the cooling medium.

6. The invention as defined in claim 5 wherein the other said pair of rollers is positioned to guide the sheet material out of contact with said peripheral surface at a location where the surface is removed from heat exchanging relationship with the cooling medium and the area where the surface begins to be inductively heated.

7. The invention as defined in claim 1 wherein said hollow cylinder includes concentric hollow shaft means for introducing said cooling medium to the interior thereof.

8. The invention as defined in claim 7 wherein said hollow shaft means includes a fixed pipe and a rotatable coupling connecting the pipe with a rotating element of the cylinder.

9. The invention as defined in claim 1 wherein the said electromagnetic means includes an electromagnet having at last two pole pieces arranged for inductive coupling with the peripheral surface of said cylinder during rotation, said means for maintaining cooling medium includes a fixed pipe and rotatable coupling means connecting said pipe with an element rotatable with said cylinder, and said means for guiding sheet material includes two horizontally positioned guide means for holding successive lengths of sheet material in heat-exchanging relationship with successive areas of the peripheral surface of said cylinder during rotation.

10. The invention as defined in claim 9 wherein said successive lengths of sheet material are held successively in heat exchanging relationship with a heated area followed by a cooled area.

* * * * *